(12) United States Patent
Kimura

(10) Patent No.: US 9,573,423 B2
(45) Date of Patent: Feb. 21, 2017

(54) RETREADED TIRE

(75) Inventor: Shigeo Kimura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 715 days.

(21) Appl. No.: 13/577,138

(22) PCT Filed: Feb. 4, 2011

(86) PCT No.: PCT/JP2011/000650
§ 371 (c)(1),
(2), (4) Date: Aug. 23, 2012

(87) PCT Pub. No.: WO2011/096235
PCT Pub. Date: Aug. 11, 2011

(65) Prior Publication Data
US 2012/0308793 A1  Dec. 6, 2012

(30) Foreign Application Priority Data
Feb. 4, 2010  (JP) ................. 2010-023298

(51) Int. Cl.
| B32B 25/04 | (2006.01) |
| B32B 25/10 | (2006.01) |
| B32B 7/02 | (2006.01) |
| B60C 1/00 | (2006.01) |
| B60C 11/02 | (2006.01) |
| C08K 5/3415 | (2006.01) |
| C08K 5/40 | (2006.01) |
| B60C 11/00 | (2006.01) |
| B29D 30/54 | (2006.01) |

(52) U.S. Cl.
CPC ............ B60C 11/02 (2013.01); B60C 1/0016 (2013.04); B60C 11/005 (2013.01); C08K 5/3415 (2013.01); C08K 5/40 (2013.01); *B29D 2030/544* (2013.01); *B60C 2011/0025* (2013.04); *Y02T 10/862* (2013.01); *Y10T 428/24942* (2015.01); *Y10T 428/3183* (2015.04); *Y10T 428/31826* (2015.04); *Y10T 428/31924* (2015.04)

(58) Field of Classification Search
CPC ............. B60C 1/00; B32B 25/10; B32B 25/04
USPC ................. 428/212, 492, 493, 519
See application file for complete search history.

(56) References Cited

U.S. PATENT DOCUMENTS

| 3,759,306 A | * | 9/1973 | Greiner et al. ............ 152/209.4 |
| 5,623,017 A | * | 4/1997 | Kuebler ........................ 524/105 |
| 5,885,385 A | * | 3/1999 | Noji et al. ..................... 152/458 |
| 6,005,397 A | * | 12/1999 | Zoughi et al. ................ 324/644 |
| 6,220,326 B1 | * | 4/2001 | Blok et al. ................... 152/564 |
| 2006/0096696 A1 | * | 5/2006 | Oku et al. .................... 156/117 |

FOREIGN PATENT DOCUMENTS

| EP | 0370664 B1 * | 9/1992 | |
| EP | 1097951 A2 * | 5/2001 | ............ B29D 30/54 |
| EP | 1 533 338 A1 | 5/2005 | |
| EP | 1 757 463 A2 | 2/2007 | |
| JP | 55152612 A | 11/1980 | |
| JP | 08058320 A | * | 3/1996 |
| JP | 08-216616 A | 8/1996 | |
| JP | 08216616 A | * | 8/1996 |
| JP | 2001-138407 A | 5/2001 | |
| JP | 2001138407 A | * | 5/2001 |
| JP | 2001240707 A | 9/2001 | |
| JP | 2002-039245 A | 2/2002 | |
| JP | 2002-069237 A | 3/2002 | |
| JP | 200280643 A | 3/2002 | |
| JP | 200451796 A | 2/2004 | |
| JP | 2004-224278 A | 8/2004 | |
| JP | 2004217726 A | 8/2004 | |
| JP | 2004224278 A | * | 8/2004 |
| JP | 2008-094266 A | 4/2008 | |
| JP | 2008-184551 A | 8/2008 | |
| JP | 2009-108117 A | 5/2009 | |
| JP | 2009108117 A | * | 5/2009 |
| WO | 2008/012337 A1 | 1/2008 | |
| WO | 2008/125645 A1 | 10/2008 | |
| WO | WO 2008125645 A1 | * | 10/2008 |

OTHER PUBLICATIONS

All About Tyres, "Tyre Retreading," http://knowyourtyres.blogspot.com/2009/09/tyre-retreading.html, Sep. 2009.*
First Office Action issued Jul. 3, 2014 in corresponding Chinese Patent Application No. 201180015582.5 with English translation.
Communication from the European Patent Office issued Sep. 1, 2014 in a counterpart European Application No. 11739584.8.
Notification of Reasons for Refusal issued Nov. 11, 2014 in corresponding Japanese Patent Application No. 2011-552711 with translation.
International Search Report of PCT/JP2011/000650 dated Apr. 5, 2011.
Communication dated Jun. 23, 2015 from the Japanese Patent Office in counterpart application No. 2011-552711.
Communication dated Dec. 15, 2015, issued by the Japan Patent Office in corresponding Japanese Application No. 2011-552711.

* cited by examiner

Primary Examiner — Aaron Austin
Assistant Examiner — Michael Zhang
(74) Attorney, Agent, or Firm — Sughrue Mion, PLLC

(57) ABSTRACT

Provided is a retreaded tire that uses cushion rubber for retread that is able to further improve the prevention of separation failure while effectively suppressing blowout within the cushion rubber layer. The retreaded tire includes cushion rubber for retread, a base tire, and precured tread rubber formed of at least one rubber layer, and is characterized by: the aforementioned cushion rubber for retreaded tires being formed from a rubber composition containing specific quantities of a highly reinforcing carbon black of at least HAF grade, and natural rubber and/or synthetic polyisoprene rubber; the 100% modulus ($A_M$) of the rubber layer (A) that comprises the aforementioned cushion rubber for retread being at least 3.0 MPa and less than 6.0 MPa; and the outermost layer (B) of the aforementioned base tire and the innermost layer (C) of the aforementioned precured tread rubber being formed from a rubber composition containing specific quantities of natural rubber and/or synthetic polyisoprene rubber.

5 Claims, No Drawings

RETREADED TIRE

CROSS REFERENCE TO RELATED APPLICATIONS

This application is a National Stage of International Application No. PCT/JP2011/000650 filed Feb. 4, 2011, claiming priority based on Japanese Patent Application No. 2010-023298 filed Feb. 4, 2010, the contents of all of which are incorporated herein by reference in their entirety.

TECHNICAL FIELD

The present invention relates to a retreaded tire that uses cushion rubber for retread, the cushion rubber being formed of a rubber composition having a specific degree of elasticity (modulus), and more particularly to a retreaded tire suited for cold process manufacturing.

RELATED ART

Conventionally, there has been known, as one of the representative methods of manufacturing a retreaded tire for use as a radial tire for trucks and buses (hereinafter, referred to as "TBR"), a method of buffing a tread surface of a worn-out tire that has outlived its primary life (hereinafter, referred to as "base tire") and attaching, onto the buffed surface, a retreaded tread rubber portion (precured tread) which has been vulcanized in advance. This method is called "cold process" or "precure method", and differentiated from hot process in which unvulcanized tread rubber is placed on a base tire so as to be subjected to mold-vulcanization.

The aforementioned cold process generally employs a method in which unvulcanized cushion rubber is first attached onto the base tire, and then precured tread is further attached onto the cushion rubber, which are heated in a vulcanizer at temperatures of 110 to 140° C., so that the precured tread and the base tire are adhered to each other. The cushion rubber used in this method flows into the buff flaws, thereby smoothing the adhesion surface, to thereby serve a function for ensuring the adhesion between the precured tread and the base tire when the base tire and the precured tread are both subjected to covulcanization. Therefore, the cushion rubber is disposed at a position sandwiched between the base tire and the precured tread, that is, a portion to be subjected to stress concentration. For this reason, the adhesion and the fracture resistance of this portion plays a key role in ensuring durability of the retreaded tire (without causing separation of the precured tread from the base tire) at the point of actual use of the retreaded tire. Therefore, it has been conventionally known that the cushion rubber employed as described above needs to have a fracture resistance (TB) equal to or higher than those of the surface layer rubber of the base tire and the precured tread rubber.

For example, JP 2002-69245 A, JP 2008-94266 A, and JP 2009-108117 A (hereinafter, each referred to as Cited Documents 1 to 3, respectively) each disclose a method of producing a rubber composition in which vulcanization productivity, and low viscosity or high viscosity, together with fracture resistance (TB) are attained even after aging. Further, JP 2002-69237 A (hereinafter, referred to as Cited Document 4) describes that it is preferred that a rubber composition have a high TB and a low modulus for ensuring separation resistance during running.

Meanwhile, a high-speed heavy-load retreaded tire typified by a retreaded aircraft tire is conventionally manufactured by hot process, without using cold process in general, and there is found no high-speed heavy-load tire manufactured by cold process available in the market. In particular, aircraft tires are used under heavy-load and high-speed conditions several times severer as compared to a radial tire of the same size for trucks and buses, and therefore, retreaded aircraft tires are required to have higher separation resistance and durability. JP H08-216616 A (hereinafter, referred to as Cited Document 5) discloses, as an example of the aforementioned high-speed heavy-load retreaded tire, a high-speed heavy-load retreaded tire manufactured by hot process, in which the 100% modulus of the cushion rubber has a 100% modulus ratio of the coating rubber of the carcass ply of the base tire in a range from 80 to 120%, so as to be effective in improving the prevention of separation failure.

DISCLOSURE OF THE INVENTION

Problems To Be Solved By The Invention

However, when the technology disclosed in Cited Documents 1 to 4 is adopted, there arises the following problem. That is, even if the cushion rubber has a fracture resistance (TB) that is equal to or higher than that of the adjacent rubber, the adjacent rubber and the cushion rubber are susceptible to fracture at the interface or in the vicinity of the interface therebetween due to distortion concentrated on the difference in stiffness at the interface between the adjacent rubber and the cushion rubber in the case where the degree of elasticity (modulus) of the cushion rubber is too high or too low relative to that of the adjacent rubber, when force is input to the aircraft tire. In particular, when the modulus is too low, concentration of high-speed heavy-load inputs are likely to occur in the cushion rubber layer, which may leads to blowout.

When rubber layers different from each other as described above are adhered to each other, the adhesion between a vulcanized rubber layer and an unvulcanized rubber layer is likely to be weaker in general, as compared to the case where unvulcanized rubber layers are covulcanized for adhesion. A method for retreading an aircraft tire conventionally employs hot process, and hence vulcanized rubber and unvulcanized rubber are adhered to each other only at a portion between the base tire and the cushion rubber, and no consideration is given to the adhesion between the cushion rubber and the precured tread rubber.

Further, despite that Cited Document 5 defines a difference in stiffness between the cushion rubber and the carcass coating rubber, it is necessary to provide, in practice, a buffed surface of the base tire at some distance from the carcass or a belt, and hence, the carcass coating rubber is not exposed on the surface of the buffed surface that comes into contact with the cushion rubber that is unvulcanized. However, it has not yet led to define the difference in stiffness between the base tire surface and the unvulcanized cushion rubber.

In view of the above, the present invention has an object to provide a retreaded tire that uses cushion rubber for retread, which is capable of further improving the prevention of separation failure while effectively suppressing blowout within the cushion rubber layer.

MEANS FOR SOLVING THE PROBLEM

To solve the aforementioned problems, the inventors of the present invention have found cushion rubber for retread, which is formed of a rubber composition having a specific degree of elasticity (modulus), to thereby attain the present invention.

That is, the retreaded tire of the present invention includes cushion rubber for retread, a base tire, and precured tread rubber formed of at least one rubber layer, in which:

the cushion rubber for retread contains, in 100 mass % of a rubber component, 60 to 100 mass % of natural rubber and/or synthetic polyisoprene rubber, and also contains, based on 100 parts by mass of the rubber component, 30 to 50 parts by mass of a highly reinforcing carbon black of at least HAF grade;

the cushion rubber for retread forms a rubber layer (A) having the 100% modulus ($A_M$) of at least 3.0 MPa and less than 6.0 MPa; and the base tire has an outermost layer (B) and the precured tread rubber has an innermost layer (C), the outermost layer (B) and the inner most layer (C) each being formed of a rubber composition containing, in 100 mass % of a rubber component, 60 to 100 mass % of natural rubber and/or synthetic polyisoprene rubber.

The rubber composition forming the aforementioned cushion rubber for retread may further contain, based on 100 parts by mass of the rubber component, 0.1 to 4.0 parts by mass of at least one thiuram compound selected from a group consisting of a compound represented by the following Formula (I) and a compound represented by the following Formula (II).

[Chemical Formula 1]

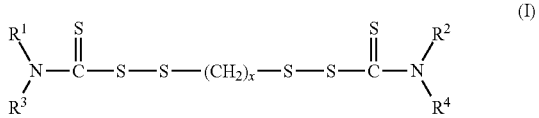

(I)

(In Formula (I), $R^1$ to $R^4$ each independently represent a benzyl group or an alkyl group having 1 to 18 carbon atoms, and x is 2 to 18 as an average number.)

[Chemical Formula 2]

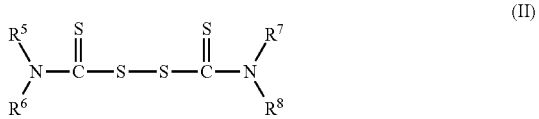

(II)

(In Formula (II), $R^5$ to $R^8$ each independently represent a benzyl group or an alkyl group having 1 to 18 carbon atoms.)

Further, the rubber composition forming the cushion rubber for retread may further contain, based on 100 parts by mass of the rubber component, 1.0 to 3.0 parts by mass of a bismaleimide compound represented by the following Formula (III).

[Chemical Formula 3]

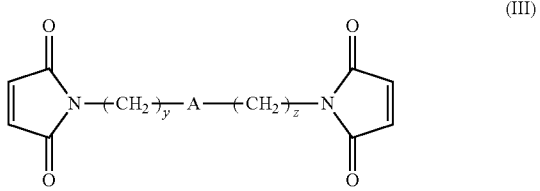

(III)

(In Formula (III), A represents a divalent aromatic group having 6 to 18 carbon atoms, or a divalent alkyl-aryl group having 7 to 24 carbon atoms, and y and z each independently represent an integer of 0 to 3.)

Further, the rubber layer (A) formed of the cushion rubber for retread has the 100% modulus ($A_M$), the outermost layer (B) of the base tire has the 100% modulus ($B_M$), and the innermost layer (C) of the precured tread rubber has the 100% modulus ($C_M$), the 100% moduluses ($A_M$), ($B_M$) and ($C_M$) desirably satisfying a relation defined by the following expressions (i) and (ii);

$$60\% \leq A_M/B_M \leq 140\% \quad (i)$$

$$60\% \leq A_M/C_M \leq 140\%. \quad (ii)$$

Further, the retreaded tire configured as described above may preferably be applied to an aircraft retreaded tire which is formed through vulcanization adhesion by means of a precure method.

EFFECT OF THE INVENTION

The retreaded tire of the present invention is capable of excellently maintaining the adhesion at the interface between the base tire and the cushion rubber and at the interface between the cushion rubber and the precured tread rubber while effectively preventing blowout within the cushion rubber layer, to thereby effectively prevent separation from being caused. Therefore, the retreaded tire of the present invention is capable of exhibiting extremely excellent durability as a retreaded tire manufactured through cold process.

The retreaded tire thus obtained is particularly useful as a retreaded aircraft tire which foresees the use under extremely severe conditions.

BEST MODES FOR CARRYING OUT THE INVENTION

In the following, the present invention is specifically described.

A retreaded tire according to the present invention includes cushion rubber for retread, a base tire, and precured tread rubber formed of at least one rubber layer, in which:

the aforementioned cushion rubber for retread is formed from a rubber composition containing, in 100 mass % of a rubber component, 60 to 100 mass % of natural rubber and/or synthetic polyisoprene rubber, and, based on 100 parts by mass of the rubber component, 30 to 50 parts by mass of a highly reinforcing carbon black of at least HAF grade;

the 100% modulus ($A_M$) of the rubber layer (A) formed of the aforementioned cushion rubber for retread is at least 3.0 MPa and less than 6.0 MPa; and the outermost layer (B) of the aforementioned base tire and the innermost layer (C) of the aforementioned precured tread rubber are each formed of a rubber composition containing, in 100 mass % of a rubber component, 60 to 100 mass % of natural rubber and/or synthetic polyisoprene rubber.

In this specification, the aforementioned outermost layer (B) of the base tire refers to a rubber layer in the vicinity of the surface of the buffed base tire, that is, a rubber layer to a depth of 1 mm in the inner center direction of the tire from the outermost surface of the base tire, and the aforementioned innermost layer (C) of the precured tread rubber refers to a layer in the vicinity of the interface with the rubber layer (A), that is, a rubber layer to a depth of 0.5 mm in the inward direction of the precured tread rubber layer from the innermost surface of the precured tread rubber.

The retreaded tire of the present invention includes: specific cushion rubber for retread to be described later; a base tire; and precured tread rubber including at least one rubber layer, the retreaded tire being manufactured by so-called cold process in which precured tread rubber including a plurality of pre-vulcanized rubber layers is attached, through a rubber layer (A) formed of an unvulcanized cushion rubber for retread, to a crown portion of the base tire formed by buffing a used tire to remove a remaining old tread rubber therefrom, and the precured tread rubber and the base tire are adhered to each other together with the rubber layer (A) by covulcanization.

The cushion rubber for retread used in the present invention is formed from a rubber composition containing, in 100 mass % of a rubber component, 60 to 100 mass % of natural rubber and/or synthetic polyisoprene rubber, and, based on 100 parts by mass of the aforementioned rubber component, 30 to 50 parts by mass of a highly reinforcing carbon black of at least HAF grade, in which the 100% modulus ($A_M$) of the rubber layer (A) formed of the aforementioned cushion rubber for retread is at least 3.0 MPa and less than 6.0 MPa The rubber composition used for the aforementioned cushion rubber for retread contains, in 100 mass % of a rubber component, 60 to 100 mass %, and preferably 80 to 100 mass % of natural rubber and/or synthetic polyisoprene rubber. In manufacturing a retreaded tire, the cushion rubber and the outermost layer (B) of the base tire are each formed of unvulcanized rubber and vulcanized rubber, respectively, and hence have an interface which is difficult to covulcanize. When the rubber composition forming the aforementioned cushion rubber contains, in 100 mass % of a rubber component, less than 60 mass % of natural rubber and/or synthetic polyisoprene rubber, the rubber composition forming the outermost layer (B) of the base tire needs to include, in 100 mass % of the rubber component, 60 mass % or more of natural rubber and/or synthetic polyisoprene rubber in order to ensure durability, with the result that the adhesion at the interface between the cushion rubber and the base tire is degraded due to the lack of covulcanizability therebetween, making the interface susceptible to separation.

Other examples of the rubber component that can be used, in addition to natural rubber and a synthetic polyisoprene rubber, are not particularly limited, and may include: styrene-butadiene rubber (SBR); polybutadiene (BR); acrylonitrile-butadiene rubber (NBR); silicone rubber; fluorine-containing elastomer; ethylene-acrylic rubber; ethylene-propylene rubber (EPR); ethylene-propylene diene monomer (EPDM) rubber; butyl rubber; polychloroprene; and hydrogenated nitrile rubber. Of those, styrene-butadiene rubber (SBR) and polybutadiene (BR) are particularly preferred. The stylene content in styrene-butadiene rubber (SBR) may preferably be similar to the stylene content in styrene-butadiene rubber (SBR) in the rubber composition forming the inner most layer (C) of the precured tread rubber.

The rubber composition used in the aforementioned cushion rubber for retread uses, as a carbon black, a highly reinforcing carbon black of at least HAF grade. The highly reinforcing carbon black of at least HAF grade refers to a carbon black that has a specific surface area (m²/g) evaluated based on iodine absorption or DBP absorption equal to or larger than that of a carbon black of HAF grade. Examples thereof may include, other than HAF (N330), ISAF (N220) and the like. A carbon black of less than HAF grade (such as FEF grade or GPF grade) may make it difficult to attain both high fracture strength and high heat resistance at the same time.

Preferred examples of the aforementioned highly reinforcing carbon black of at least HAF grade preferably include, more specifically, N330, N335, N339, N343, N347, N351, N356, N358, N375, N220, and N234. Of those, N330, N335, N339, N343, N347, and N220 are more preferred.

The rubber composition used for the aforementioned cushion rubber for retread contains, based on 100 parts by mass of the rubber component, 30 to 50 parts by mass, preferably 35 to 50 parts by mass, and more preferably 35 to 45 parts by mass of the aforementioned highly reinforcing carbon black of at least HAF grade. If the content of the carbon black is less than 30 parts by mass, the mechanical strength becomes insufficient, whereas if the content thereof exceeds 50 parts by mass, the exothermic properties may be deteriorated while seeing an increase in viscosity and a reduction in adhesion at the unvulcanized state, which may result in insufficient capability of following the surface irregularities of the buffed surface and adhesion failure at the unvulcanized state.

The rubber composition used for the aforementioned cushion rubber for retread may preferably include at least one thiuram compound selected from a group consisting of a compound represented by the following Formula (I) and a compound represented by the following Formula (II). In the case of manufacturing the retreaded tire of the present invention using the aforementioned cushion rubber, cold process is employed, in which only the rubber layer including this cushion rubber needs to be vulcanized. Therefore, it is desirable to perform the vulcanization at a high rate of vulcanization without causing scorching of the rubber until the formation process of the retreaded tire. The inclusion of the aforementioned thiuram compound makes it easy to attain both excellent vulcanization rate and scorch resistance at the same time.

[Chemical Formula 4]

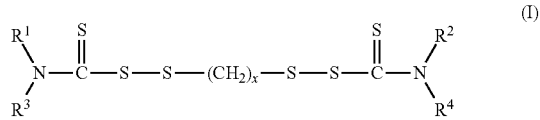

[Chemical Formula 5]

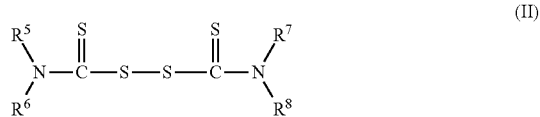

In Formula (I), $R^1$ to $R^4$ each independently represent a benzyl group or an alkyl group having 1 to 18 carbon atoms, and preferably represent a benzyl group or an alkyl group having 4 to 12 carbon atoms. Examples of the alkyl group having 1 to 18 carbon atoms include a group of a straight or branched chain of a methyl group, an ethyl group, a propyl group, a butyl group, a pentyl group, a hexyl group, a heptyl group, an octyl group, a nonyl group, a decyl group, an undecyl group, a dodecyl group, tridecyl group, tetradecyl group, a pentadecyl group, a hexadecyl group, a heptadecyl group, and an octadecyl group. An average number of x is 2 to 18, and preferably 6 to 12.

Examples of the thiuram compound represented by Formula (I) may include 1,6-Bis (N,N'-dibenzylthiocarbamoyldithio)-hexan and 1,6-Bis(N,N'-di(2-ethylhexyl)thiocarbamoyldithio)-hexan.

In Formula (II), $R^5$ to $R^8$ each independently represent a benzyl group or an alkyl group having 1 to 18 carbon atoms, and preferably represent a benzyl group or an alkyl group having 4 to 12 carbon atoms. Examples of the alkyl group having 1 to 18 include those similar to the above.

Examples of the thiuram compound represented by Formula (II) may include tetramethylthiuram disulfide, tetraethylthiuram disulfide, tetrabutylthiuram disulfide, and tetrakis(2-ethylhexyl)thiuram disulfide.

Only one kind of these thiuram compounds may be used alone or two or more kinds thereof may be used in combination. Of those, 1,6-Bis (N,N'-dibenzylthiocarbamoyldithio)-hexan may preferably be used, which is commercially available as, for example, VULCUREN KA9188 (registered trademark, manufactured by LANXESS).

The rubber composition may contain, based on 100 parts by mass of the rubber component, preferably 0.1 to 4.0 parts by mass in total, and more preferably 0.2 to 1.0 parts by mass in total of the aforementioned thiuram compound. If the content of the thiuram compound is less than 0.1 parts by mass, a desired vulcanization accelerating performance may not be sufficiently attained, whereas if the content thereof exceeds 4.0 parts by mass, the scorch resistance and the heat aging resistance may be needlessly deteriorated.

The rubber composition used for the aforementioned cushion rubber for retread may preferably include a bismaleimide compound represented by the following Formula (III). The inclusion of the aforementioned bismaleimide compound can improve the modulus and the heat aging resistance. Although it generally involves extreme difficulty in completely eliminating the difference in stiffness between the cushion rubber and the adjacent rubber, the bismaleimide compound thus included can easily ensure excellent heat resistance even if the rubber layer formed of the cushion rubber may be subjected to some concentrated distortion due to the lack of stiffness.

[Chemical Formula 6]

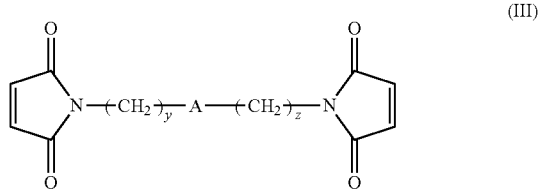

(III)

In Formula (III), A represents a divalent aromatic group having 6 to 18 carbon atoms, or a divalent alkyl-aryl group having 7 to 24 carbon atoms. Specific examples of A may include the groups represented by the following Formulae.

[Chemical Formula 7]

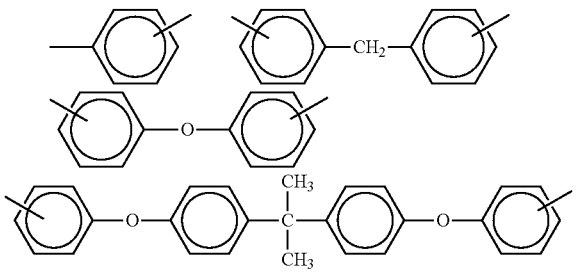

In Formula (III), y and z each independently represent an integer of 0 to 3. It is preferred that y and z are each smaller than 4, because otherwise the molecular weight becomes too large to obtain a desired heat-resistance improving effect commensurate to the content.

Specific examples of the bismaleimide compound represented by the aforementioned formula (III) may include: N,N'-1,2-phenylene bismaleimide, N,N'-1,3-phenylene bismaleimide, N,N'-1,4-phenylene bismaleimide, N,N'-(4,4'-diphenylmethane)bismaleimide, N,N'-(4,4'-diphenyl ether) bismaleimide, 2,2-Bis[4-(4-maleimide phenoxy)phenyl] propane, Bis(3-ethyl-5-methyl-4-maleimide phenyl) methane. Only one kind of these bismaleimide compounds may be used alone or two or more kinds thereof may be used in combination. Of those, N,N'-(4,4'-diphenylmethane)bismaleimide may preferably be used.

The rubber composition may contain, based on 100 parts by mass of a rubber component, preferably 1.0 to 3.0 parts by mass in total, and more preferably 1.0 to 2.0 parts by mass in terms of cost of the aforementioned bismaleimide compound. If the content of the thiuram compound is less than 1.0 parts by mass, the heat-resistance improving effect is likely to be rendered insufficiently, whereas if the content thereof exceeds 3.0 parts by mass, the fracture property and the resistance to fatigue from flexing may be needlessly deteriorated.

Further, the aforementioned rubber composition may include a bulking agent such as: a vulcanizing agent; a vulcanization accelerator; oil; a tackifier; an antioxidant; an aliphatic acid; a softening agent; a peptizing agent; a retarder; and silica, and a compounding agent such as: an activator; an processing additive agent; a plasticizer; a pigment; and an antiozonant, without inhibiting the effect of the present invention. Examples of the aforementioned vulcanization accelerator may include N-tert-butyl-2-benzothiazolylsulphenamide (BBS), 2-mercaptobenzothiazole, and diphenylguanidine (DPG), which are commercially available as, for example, Nocceler NS, Nocceler M, and Nocceler D (registered trademarks, manufactured by Ouchi Shinko Chemical Industrial Co., Ltd.).

The 100% modulus of the rubber layer (A) formed of the cushion rubber for retread of the present invention is at least 3.0 MPa and less than 6.0 MPa, and preferably 3.0 to 3.5 MPa, and more preferably 4.0 to 5.0 MPa. If the 100% modulus is less than 3.0 MPa or 6.0 MPa or larger, a difference in stiffness is highly likely to be generated at the interface between the cushion rubber and the adjacent rubber forming the base tire and the precured tread, and distortion is concentrated on the interface, making the interface susceptible to separation. In particular, if the 100% modulus is less than 3.0 MPa, high-speed heavy-load inputs tend to concentrate on the cushion rubber layer, which may cause blowout within the layer.

Here, the adjacent rubber to be brought into contact with the cushion rubber for retread is applied with a rubber cement which is made of rubber dissolved in a solvent, so as to form a rubber layer of several um after the solvent is dried. The rubber layer thus formed corresponds to unvulcanized rubber. Therefore, the rubber layer (A) formed of the aforementioned cushion rubber for retread herein also refers to rubber layer formed of a rubber cement as described above.

The rubber composition forming the outermost layer (B) of the aforementioned base tire and the innermost layer (C) of the precured tread rubber contains, in 100 mass % of a rubber component, 60 to 100 mass %, and preferably 80 to 100 mass % of natural rubber and/or synthetic polyisoprene rubber.

Carcass coating rubber and belt coating rubber serving as skeletal members of a high-speed heavy-load tire each are a gum composed mainly of natural rubber and synthetic polyisoprene rubber. The outermost layer (B) of the base tire is brought into contact with these skeletal members at an interface where the difference in stiffness is large, and hence is required to exhibit high covulcanizability with these skeletal members. Therefore, if the outermost layer (B) of the base tire contains, in 100 mass % of a rubber component, less than 60 mass % of natural rubber and/or synthetic polyisoprene rubber, the covulcanizability with the skeletal members becomes insufficient, making the interface susceptible to separation.

Further, the innermost layer (C) and the rubber layer (A) of the precured tread rubber each formed of vulcanized rubber and unvulcanized rubber, respectively, and hence have an interface which is difficult to covulcanize. In this regard, if the innermost layer (C) of the precured tread rubber contains, in 100 mass % of a rubber component, less than 60 mass % of a natural rubber and/or synthetic polyisoprene rubber, the covulcanizability between the innermost layer (C) and the rubber layer (A) becomes insufficient, which results in a reduction in adhesion at the interface therebetween, making the interface susceptible to separation.

Examples of a rubber component and a compounding agent that can be used for the outermost layer (B) of the base tire and the innermost layer (C) of the precured tread rubber are not particularly limited, and may include, in addition to natural rubber and synthetic polyisoprene rubber, those used for the rubber layer (A).

The aforementioned precured tread rubber may include at least one rubber layer. If the precured tread rubber includes a plurality of rubber layers, there may also be provided a desired reinforcing fabric layer formed of a rubber-coated cord layer or the like, other than the innermost layer (C) within the precured tread rubber.

Further, the 100% modulus ($A_M$) of the rubber layer (A) formed of the aforementioned cushion rubber, the 100% modulus ($B_M$) of the outermost layer (B) of the base tire, and the 100% modulus ($C_M$) of the inner most layer (C) of the precured tread rubber desirably satisfy the following expressions (i) and (ii);

$$60\% \leq A_M/B_M \leq 140\% \quad \text{(i)}$$

$$60\% \leq A_M/C_M \leq 140\%, \quad \text{(ii)}$$

and more desirably satisfy that the following expressions (i-1) and (ii-1);

$$80\% \leq A_M/B_M \leq 120\% \quad \text{(i-1)}$$

$$80\% \leq A_M/C_M \leq 120\%. \quad \text{(ii-1)}$$

If $A_M/B_M$ and $A_M/C_M$ each fall below 60% or exceed 120%, a difference in stiffness is generated at the interface between the rubber layer (A) and the rubber layer of the base tire or of the precured tread rubber, and the distortion is likely to be concentrated on the interface, which may lead to a reduction in adhesion at the interface, causing separation at the interface. Further, if $A_M/B_M$ and $A_M/C_M$ each fall below 60%, distortion in the rubber layer (A) itself is likely to be increased while excessive heat is also likely to be generated, which may easily lead to a blowout failure.

Aircraft tires are often used under extremely severe use conditions, and therefore, the retreaded tire configured as described above may suitably be applied to the retreaded aircraft tire through vulcanization adhesion by precure method, to thereby exert extremely excellent anti-separation performance and durability.

EXAMPLES

In the following, the present invention is specifically described with reference to Examples. However, the present invention is no way limited by those Examples.

Examples 1 to 7, Comparative Examples 1 to 8

According to the ingredient formulation shown in Tables 1 to 2, rubber compositions were formed with further addition of based on 100 parts by mass of a rubber component, 3.0 parts by mass of a stearic acid, 5.0 parts by mass of a zinc oxide, 2.0 parts by mass of an antioxidant (NOCRAC 6C manufactured by Ouchi Shinko Chemical Industrial Co., Ltd.), 1.5 to 3.5 parts by mass of sulfur, and a vulcanization accelerator as appropriate and each of the rubber compositions thus formed were applied to the cushion rubber layer (A), the outermost layer (B) of the base tire, and the innermost layer (C) of the precured tread rubber, to thereby manufacture aircraft radial retreaded tires (in a size 30×8.8 R15 16PR) through cold process. The following evaluations were made on the retreaded tires thus manufactured.

<<Measurement of 100% Modulus>>

Rubber sheets of 0.3 mm in thickness were cut out from each member of the obtained retreaded tires, which were further cut by a DINS3A-type knife edge, to thereby form test samples. The samples were subjected to measurements of the 100% modulus ($A_M$) of the cushion rubber (A), of the 100% modulus ($B_M$) of the outermost layer (B) of the base tire, and of the 100% modulus ($C_M$) of the innermost layer (C) of the precured tread rubber, under the condition of a pulling rate of 100 mm/minute, so as to obtain the modulus contrasts of $A_M/B_M$ and of $A_M/C_M$. The results are shown in Tables 1 to 2.

<<Drum Durability Test>>

The obtained retreaded tires were each mounted on a rim, to thereby form a rim assembly. The rim assembly thus formed was attached to a drum tester, so as to be tested for one cycle according to "TSO-C62 d" approved by the U.S. Federal Aviation Administration (FAA), and evaluations were made based on the following criteria. The results are shown in Tables 1 to 2.

No failure: No blowout occurred within the rubber layer (A) and nothing abnormal was detected at any of the interfaces between the rubber layers (A) to (C).

Blowout: Blowout occurred within the rubber layer (A).

Separation: A separation failure occurred in the vicinity of any of the interfaces between the rubber layers (A) to (C).

TABLE 1

|  |  |  | Example 1 | Example 2 | Example 3 | Example 4 | Example 5 | Example 6 | Example 7 |
|---|---|---|---|---|---|---|---|---|---|
| Ingredient Formulation | Rubber layer (A) | natural rubber*[1] | 100 | 100 | 100 | 100 | 80 | 70 | 100 |
|  |  | SBR*[2] | — | — | — | — | 20 | 30 | — |
|  |  | carbon black (N220) | 35 | — | 35 | — | — | — | — |
|  |  | carbon black (N330) | — | 48 | — | 40 | 40 | 40 | 40 |
|  |  | carbon black (N550) | — | — | — | — | — | — | — |
|  |  | thiuram compound*[3] | — | — | 0.5 | 0.5 | 0.5 | 0.5 | — |
|  |  | bismaleimide*[4] | 2.5 | — | 2.5 | 1.7 | 1.7 | 1.7 | 1.7 |
|  | Rubber layer (B) | natural rubber*[1] | 100 | 100 | 100 | 100 | 80 | 70 | 70 |
|  |  | SBR*[2] | — | — | — | — | 20 | 30 | 30 |
|  | Rubber layer (C) | natural rubber*[1] | 100 | 100 | 80 | 70 | 70 | 70 | 70 |
|  |  | BR*[5] | — | — | 20 | 30 | 30 | 30 | 30 |

TABLE 1-continued

|  |  | Example 1 | Example 2 | Example 3 | Example 4 | Example 5 | Example 6 | Example 7 |
|---|---|---|---|---|---|---|---|---|
| 100% modulus | $A_M$ (MPa) | 3.1 | 5.3 | 3.1 | 3.9 | 3.9 | 3.9 | 4.0 |
|  | $A_M/B_M$ (%) | 64 | 110 | 64 | 82 | 78 | 85 | 89 |
|  | $A_M/C_M$ (%) | 71 | 125 | 81 | 96 | 94 | 94 | 98 |
| Results of Drum Durability Test |  | no failure | no failure | no failure | no failure | no failure | no failure | no failure |

TABLE 2

|  |  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|
| Ingredient Formulation | Rubber layer (A) | natural rubber*1 | 100 | 100 | 50 | 100 | 100 | 100 | 70 | 100 |
|  |  | SBR*2 | — | — | 50 | — | — | — | 30 | — |
|  |  | carbon black (N220) | 35 | — | — | — | — | — | — | 28 |
|  |  | carbon black (N330) | — | 55 | 40 | 40 | 40 | — | 52 | — |
|  |  | carbon black (N550) | — | — | — | — | — | 50 | — | — |
|  |  | thiuram compound*3 | 0.5 | 1.0 | 0.5 | 0.5 | 0.5 | 0.5 | 0.5 | 0.5 |
|  |  | bismaleimide*4 | — | 1.0 | 2.0 | 1.7 | 1.7 | 2.7 | — | 2.5 |
|  | Rubber layer (B) | natural rubber*1 | 100 | 100 | 100 | 50 | 100 | 100 | 100 | 100 |
|  |  | SBR*2 | — | — | — | 50 | — | — | — | — |
|  | Rubber layer (C) | natural rubber*1 | 100 | 100 | 70 | 100 | 50 | 100 | 100 | 100 |
|  |  | BR*5 | — | — | 30 | — | 50 | — | — | — |
| 100% modulus |  | $A_M$ (Mpa) | 2.8 | 6.3 | 3.9 | 4.0 | 3.9 | 5.2 | 5.9 | 3.0 |
|  |  | $A_{MM}/B_M$ (%) | 59 | 125 | 82 | 90 | 81 | 109 | 122 | 62 |
|  |  | $A_M/C_M$ (%) | 65 | 147 | 96 | 94 | 101 | 118 | 137 | 68 |
| Results of Drum Durability Test |  |  | blowout | separation | separation | separation | separation | blowout | blowout | blowout |

*1: RSS#3
*2: tin tetrachloride-modified styrene-butadiene rubber manufactured by JSR Corporation (which contains styrene by 5% and vinyl by 34%).
*3: 1,6-Bis (N,N'-diisobutylcarbamoyldithio)—hexan
*4: N,N'-(4,4'-diphenylmethane) bismaleimide
*5: butadiene rubber, BR01, manufactured by JSR Corporation Tables 1 to 2 show that the retreaded tires of Examples 1 to 7 which use the aforementioned cushion rubber, base tire rubber and precured tread rubber demonstrate more excellent durability as compared to Comparative Examples 1 to 8.

The invention claimed is:

1. A retreaded aircraft tire comprising cushion rubber for retread, a base tire comprising a skeletal carcass member, and precured tread rubber formed of at least one rubber layer,
wherein the cushion rubber for retread contains, in 100 mass % of a rubber component, 60 to 100 mass % of natural rubber and/or synthetic polyisoprene rubber, and also contains, based on 100 parts by mass of the rubber component, 30 to 50 parts by mass of a highly reinforcing carbon black of at least HAF grade,
wherein the cushion rubber for retread forms a rubber layer (A) having a 100% modulus ($A_M$) of at least 3.0 MPa and less than 6.0 MPa, and
wherein the base tire has an outermost layer (B) located in a depth of 1mm in the inner center direction of the tire from the outermost surface of a buffed surface of the base tire at some distance from the skeletal carcass member and the precured tread rubber has an innermost layer (C), the outermost layer (B) and the inner most layer (C) each being formed of a rubber composition containing, in 100 mass % of a rubber component, 60 to 100 mass % of natural rubber and/or synthetic polyisoprene rubber
and wherein the rubber layer (A) formed of the cushion rubber for retread has the 100% modulus ($A_M$), the outermost layer (B) of the base tire has the 100% modulus ($B_M$), and the innermost layer (C) of the precured tread rubber has the 100% modulus ($C_M$), the 100% moduluses ($A_M$), ($B_M$) and ($C_M$) satisfying a relation defined by the following expressions (i) and (ii);

$$60\% \leq A_M/B_M \leq 140\% \quad (i)$$

$$60\% \leq A_M/C_M \leq 140\% \quad (ii)$$

wherein the rubber composition forming the cushion rubber for retread further contains, based on 100 parts by mass of the rubber component, 1.0 to 3.0 parts by mass of a bismaleimide compound represented by the following Formula (III);

[Chemical Formula 3]

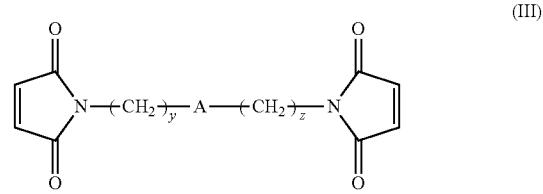

(III)

in Formula (III), A represents a divalent aromatic group having 6 to 18 carbon atoms, or a divalent alkyl-aryl group having 7 to 24 carbon atoms, and y and z each independently represent an integer of 0 to 3.

2. The retreaded aircraft tire according to claim 1, wherein the rubber composition forming the cushion rubber for retread further contains, based on 100 parts by mass of the rubber component, 0.1 to 4.0 parts by mass of at least one thiuram compound selected from a group consisting of a compound represented by the following Formula (I) and a compound represented by the following Formula (II);

[Chemical Formula 1]

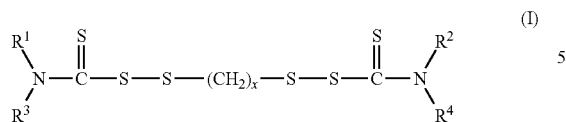

(in Formula (I), $R^1$ to $R^4$ each independently represent a benzyl group or an alkyl group having 1 to 18 carbon atoms, and x is 2 to 18 as an average number);

[Chemical Formula 2]

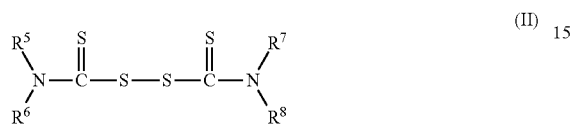

(in Formula (II), $R^5$ to $R^8$ each independently represent a benzyl group or an alkyl group having 1 to 18 carbon atoms).

3. The retreaded aircraft tire according to claim 1 comprising a retreaded aircraft tire formed through vulcanization adhesion by means of a precure method.

4. The retreaded aircraft tire according to claim 2 comprising a retreaded aircraft tire formed through vulcanization adhesion by means of a precure method.

5. The retreaded aircraft tire according to claim 1 wherein the cushion rubber for retread contains, in 100 mass % of a rubber component, 80 to 100 mass % of natural rubber and/or synthetic polyisoprene rubber.

* * * * *